United States Patent
Krass et al.

(10) Patent No.: US 10,008,789 B1
(45) Date of Patent: Jun. 26, 2018

(54) ANGLED BOLT T-BAR BATTERY TERMINAL CLAMP

(71) Applicant: Royal Die & Stamping Co., Inc., Carol Stream, IL (US)

(72) Inventors: Steve Krass, St. Charles, IL (US); Wayne Rohr, Bloomingdale, IL (US); Nathaniel Hollin, Carol Stream, IL (US)

(73) Assignee: ROYAL DIE & STAMPING, LLC, Carol Stream, IL (US)

( * ) Notice: Subject to any disclaimer, the term of this patent is extended or adjusted under 35 U.S.C. 154(b) by 0 days. days.

(21) Appl. No.: 15/645,138

(22) Filed: Jul. 10, 2017

(51) Int. Cl.
| H01R 11/28 | (2006.01) |
| H01R 4/30 | (2006.01) |
| H01R 11/26 | (2006.01) |
| H01M 2/30 | (2006.01) |

(52) U.S. Cl.
CPC ............ *H01R 11/283* (2013.01); *H01M 2/30* (2013.01); *H01R 4/305* (2013.01); *H01R 4/307* (2013.01); *H01R 11/26* (2013.01); *H01R 11/282* (2013.01); *H01R 11/289* (2013.01)

(58) Field of Classification Search
CPC ...... H01R 11/283; H01R 4/305; H01R 4/307; H01R 11/26; H01R 11/289; H01R 11/281; H01R 11/282; H01R 11/287; H01M 2/30
USPC .................................. 439/758, 761, 762, 772
See application file for complete search history.

(56) References Cited

U.S. PATENT DOCUMENTS

| 1,596,891 A | 8/1926 | Rensch |
| 1,661,375 A | 3/1928 | Leighton |
| 1,803,718 A | 5/1931 | McClellan |
| 1,977,179 A | 10/1934 | Fisch |
| 2,271,692 A | 2/1942 | Hewel |
| 2,706,284 A | 4/1955 | Hoggart |
| 2,769,964 A | 11/1956 | Lartz |
| 3,116,100 A | 12/1963 | Hunter |
| RE26,486 E | 11/1968 | Haegert |
| 3,529,281 A | 9/1970 | Martinez |

(Continued)

FOREIGN PATENT DOCUMENTS

| DE | 19748806 A1 | 5/1999 |
| DE | 10226479 C1 | 8/2003 |

(Continued)

OTHER PUBLICATIONS

Photos of multi-piece fuse blocks manufactured by Delphi & Yazaki. First aware of product Aug. 2012.

(Continued)

*Primary Examiner* — Tulsidas C Patel
*Assistant Examiner* — Travis Chambers
(74) *Attorney, Agent, or Firm* — McDermott Will & Emery LLP (57) ABSTRACT

A battery terminal clamp has a body portion with an intermediate aperture for engaging a battery post. The clamp further includes a threaded rod extending upwardly relative to the body portion at an angle to the horizontal of between 45° and 60°. A battery pull bar extends from one side wall to the opposite side wall of the body portion. A wedge-shaped element abuts one side wall of the body portion. Together with the battery pull bar, the wedge-shaped element alternately effects a reduction in, or increase in, the size of the intermediate aperture.

13 Claims, 6 Drawing Sheets

(56) References Cited

U.S. PATENT DOCUMENTS

| | | | |
|---|---|---|---|
| 3,568,138 A | 3/1971 | Bakker |
| 3,568,139 A | 3/1971 | Delzer |
| 3,922,058 A | 11/1975 | Kinnear |
| 4,054,355 A | 10/1977 | Nix |
| 4,063,794 A | 12/1977 | Dittmann |
| 4,126,367 A | 11/1978 | Miller |
| 4,354,726 A | 10/1982 | Otani |
| 4,555,159 A | 11/1985 | Chartrain |
| 4,560,230 A | 12/1985 | Inglis |
| 4,936,799 A | 6/1990 | Woodall |
| 4,947,115 A | 8/1990 | Reed |
| 4,964,818 A | 10/1990 | Weatherley |
| 4,983,086 A | 1/1991 | Hatrock |
| 5,087,214 A | 2/1992 | Dewar |
| 5,088,941 A | 2/1992 | Noelle |
| 5,120,617 A | 6/1992 | Cameron |
| 5,169,338 A | 12/1992 | Dewar |
| 5,221,219 A | 6/1993 | Thomson |
| 5,252,091 A | 10/1993 | Hattori |
| 5,254,020 A | 10/1993 | Obligar |
| 5,269,709 A | 12/1993 | Eriksson |
| 5,290,646 A | 3/1994 | Asao |
| 5,302,142 A | 4/1994 | Tabata |
| 5,302,143 A | 4/1994 | Tabata |
| 5,316,505 A | 5/1994 | Kipp |
| 5,346,407 A | 9/1994 | Hood |
| 5,389,466 A | 2/1995 | Sakatani |
| 5,429,531 A | 7/1995 | Oster |
| 5,431,580 A | 7/1995 | Tabata |
| 5,445,907 A | 8/1995 | Ito |
| D363,699 S | 10/1995 | Mountfort |
| 5,454,741 A | 10/1995 | Okada |
| 5,466,164 A | 11/1995 | Tanaka |
| 5,486,119 A | 1/1996 | Nabeshima |
| 5,486,123 A | 1/1996 | Miyazaki |
| 5,486,434 A | 1/1996 | Aoyama |
| 5,492,780 A | 2/1996 | Okada |
| 5,498,178 A | 3/1996 | Tabata |
| D371,539 S | 7/1996 | O'Glee |
| 5,547,403 A | 8/1996 | Haberstroh |
| 5,558,544 A | 9/1996 | Tabata |
| 5,584,730 A | 12/1996 | Tabata |
| 5,595,511 A | 1/1997 | Okada |
| 5,599,210 A | 2/1997 | Green |
| 5,616,055 A | 4/1997 | Heeren |
| 5,645,448 A | 7/1997 | Hill |
| 5,672,442 A | 9/1997 | Burnett |
| 5,711,688 A | 1/1998 | Matsunaga |
| 5,733,152 A | 3/1998 | Freitag |
| 5,738,552 A | 4/1998 | Gutenschwager |
| 5,800,219 A | 9/1998 | Siedlik |
| 5,805,047 A | 9/1998 | Mansutti |
| 5,851,129 A * | 12/1998 | Matsunaga .......... H01R 11/282 |
| | | 439/762 |
| 5,877,609 A | 3/1999 | Carter |
| 5,879,202 A | 3/1999 | Zhao |
| 5,941,738 A | 8/1999 | Matsunaga |
| 6,162,098 A | 12/2000 | Cheng |
| 6,165,020 A | 12/2000 | Cheng |
| 6,174,207 B1 | 1/2001 | Cleveland |
| 6,250,973 B1 | 6/2001 | Gordy |
| 6,294,978 B1 | 9/2001 | Endo |
| 6,398,595 B2 | 6/2002 | Wakata |
| 6,413,124 B2 | 7/2002 | Fukuda |
| 6,476,705 B1 | 11/2002 | Neuhauser |
| 6,509,824 B2 | 1/2003 | Hama |
| 6,512,443 B1 | 1/2003 | Inaba |
| 6,607,860 B2 | 8/2003 | Hulbert |
| 6,696,914 B2 | 2/2004 | Labitzke |
| 6,723,920 B2 | 4/2004 | Higuchi |
| 6,764,353 B2 | 7/2004 | Freitag |
| 6,805,593 B2 | 10/2004 | Durocher |
| 6,806,421 B2 | 10/2004 | Matsumura |
| 6,817,908 B2 | 11/2004 | Freitag |
| 6,855,008 B1 | 2/2005 | Freitag |
| 6,932,650 B1 | 8/2005 | Freitag |
| 7,001,226 B2 | 2/2006 | Hermann |
| 7,046,115 B2 | 5/2006 | Shimada |
| 7,077,704 B2 | 7/2006 | Saito |
| 7,166,001 B2 * | 1/2007 | Detter .................. H01R 11/283 |
| | | 439/762 |
| 7,189,122 B2 | 3/2007 | Freitag |
| 7,303,448 B1 | 12/2007 | Sproesser |
| 7,374,464 B1 | 5/2008 | De Oliveira |
| 7,597,595 B2 | 10/2009 | Ohashi |
| 7,614,921 B2 | 11/2009 | Sikora |
| 7,695,326 B1 | 4/2010 | Freitag |
| 8,337,251 B2 | 12/2012 | Ecker |
| 8,382,525 B2 | 2/2013 | Shiraki |
| 8,821,190 B2 | 9/2014 | Kibushi |
| 9,022,815 B2 * | 5/2015 | Kim ..................... H01R 11/281 |
| | | 439/762 |
| 9,093,768 B1 | 7/2015 | Freitag |
| 9,263,810 B2 * | 2/2016 | Noh .................... H01R 11/283 |
| 9,263,818 B2 | 2/2016 | Lam |
| 9,608,254 B1 | 3/2017 | Rohr |
| 2006/0135000 A1 | 6/2006 | Garretson |
| 2008/0274653 A1 | 11/2008 | Sikora |
| 2011/0195615 A1 * | 8/2011 | Falchetti ............. H01R 11/283 |
| | | 439/806 |
| 2012/0196492 A1 * | 8/2012 | Facco .................. H01R 11/283 |
| | | 439/765 |

FOREIGN PATENT DOCUMENTS

| | | |
|---|---|---|
| EP | 0374342 A1 | 6/1990 |
| WO | 2015/087663 A1 | 6/2015 |

OTHER PUBLICATIONS

International Search Report for PCT/US2006/001807 dated May 29, 2006.

* cited by examiner

ANGLED BOLT T-BAR BATTERY TERMINAL CLAMP

TECHNICAL FIELD

This invention is directed to a battery terminal clamp, and more particularly to a battery terminal clamp that enables a user to tighten that clamp onto the post of a storage battery from a top, angled orientation.

BACKGROUND OF THE INVENTION

Storage batteries of the type used in automobiles, trucks and the like, generally have a battery post made of a lead alloy material. The battery post usually has a cylindrical or frusto-conical shape. The battery is connected to the vehicle electrical system by a battery cable assembly. The cable assembly has connectors which clamp to the battery posts, providing a secure electrical and mechanical connection.

Several different kinds of connectors are known in the art. One such connector is a molded, generally U-shaped device with a bolt passing through outwardly projecting yoke-like arms. Another more commonly used connector is a stamped battery terminal clamp, fabricated from sheet metal.

U.S. Pat. No. 5,733,152 ("the '152 patent") is directed to a battery terminal clamp. The '152 patent is owned by the assignee of the present application, and relates to a battery terminal clamp which permits improved mechanical and electrical connection to a battery terminal post. The connector of the '152 patent has enhanced resistance to rotation when connected to a battery terminal post. That connector is also economical to manufacture, and is adaptable for automated assembly and production. An additional advantage of this connector is that it is adaptable to different automobile models and batteries U.S. Pat. No. 6,817,908 ("the '908 patent") is also directed to a battery terminal clamp, and is owned by the assignee of the present application. The '908 patent includes an intermediate aperture, a vertically disposed threaded rod, a threaded nut secured to the threaded rod, and a pair of wedge-shaped elements. Downward movement of the threaded nut along the threaded rod causes a responsive movement of the pair of wedge-shaped elements. The movement of these wedge-shaped elements in turn reduces the size of the intermediate aperture, and tightens the battery terminal clamp onto the post of the storage battery.

U.S. Pat. No. 5,879,202 ("the '202 patent") is also directed to a battery terminal clamp. This connector is of the type that permits it to be tightened on the battery post using a threaded nut that is positioned above, rather than on the side of, the connector. As a result, especially in tight, confined areas found under the hoods of modern automobiles, one installing the clamp of the '202 patent can more easily access the nut during that installation.

Additional relevant prior art references include U.S. Pat. Nos. 6,250,973; 5,941,738; 5,800,219; 5,738,552; 5,711,688; 5,672,442; 5,599,210; 5,316,505; 4,354,726; 4,063,794; 4,054,355; and 3,568,138. None of these patents, however, alone or in combination, disclose the present invention.

SUMMARY OF THE INVENTION

The invention is a battery terminal clamp having a body portion. This body portion has a top, a bottom, and a pair of opposite side walls. The connector also includes an intermediate aperture for engaging a battery post. The size of the intermediate aperture is variable from a size well in excess of the diameter of the battery post to which it is to be connected, to a size somewhat smaller than the diameter of the battery post to which it is to be connected. In this way, the connector can accommodate its placement onto, and its removal from, the battery post.

The connector further includes a generally horizontal, T-shaped battery pull bar. This pull bar is positioned along a line extending generally from one side wall of the connector to the other side wall of the connector. The pull bar has an end flange at one of its ends.

A rod, preferably a threaded rod, extends upwardly at an angle of between 30° and 65° from the horizontal, and its movement facilitates the opening and closing of the intermediate aperture of the connector.

The connector further includes a wedge-shaped element. This element is positioned generally adjacent to the threaded rod, and is guidably moved along this threaded rod.

A threaded nut is rotatably secured to the threaded rod. The threaded nut is positioned above the wedge-shaped element, and directly or indirectly abuts against the wedge-shaped element. As the threaded nut is moved along the threaded rod and in a generally downward direction, the nut pushes upon that wedge-shaped element. In turn, the wedge-shaped element forces the horizontal pull bar laterally and to the right, i.e., in a direction away from the side wall of the connector, so as to cause a closure or reduction in size of the intermediate aperture.

In a further embodiment, the battery terminal clamp is made of copper or a copper alloy.

In yet another embodiment, the battery terminal clamp is made of one piece.

DETAILED DESCRIPTION

There are many possible embodiments of this invention. The drawings and description below describe in detail two preferred embodiments of the invention. The present disclosure is to be considered as an example of the principles of the invention. The disclosure is not intended to limit the broad aspect of the invention to the illustrated embodiments.

Figure 1:
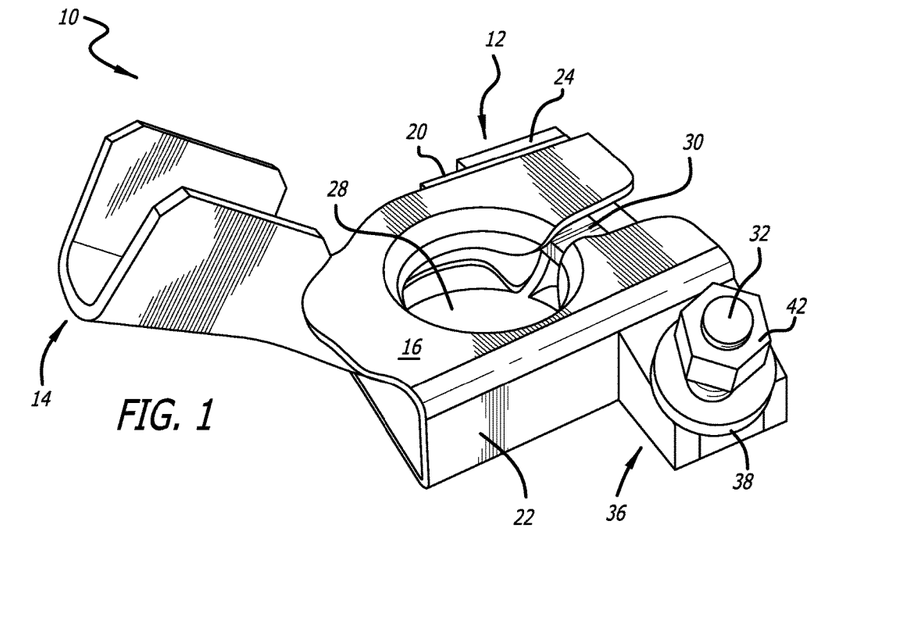
FIG. 1 is a perspective view of a first embodiment of the battery terminal clamp of the present invention, and with the threaded nut in a relatively high position upon its threaded rod and spaced apart from a washer.

Referring to the drawings, FIG. 1 shows a perspective view of one embodiment of a battery terminal clamp 10 in accordance with the invention. The clamp 10 comprises essentially two main portions, including a body portion 12 and a ferrule portion 14.

The battery terminal clamp 10 is preferably made of copper or a copper alloy. The clamp 10, including the body portion 12 and the ferrule portion 14, is formed from a metal blank, such as a single, flat piece of copper. Manufacturing the clamp 10 by a stamping process as a single blank is convenient and cost-efficient.

When the clamp 10 of FIG. 1 has been fully fabricated and is ready for use, the body portion 12 is fitted over a frusto-conical shaped terminal post (not shown) of a storage battery for a motor vehicle.

The ferrule portion 14 is adapted for electrically connecting and securing a battery cable (not shown). As a result of this connection, electrical current can pass from the terminal post of the vehicle's storage battery, and then through the body portion 12, the ferrule 14, and the cable, and then on to various power consuming components of the motor vehicle.

The insulation-free end of the battery cable is placed onto the malleable ferrule 14. Then, the sides of the ferrule 14 are pushed towards each other so as to firmly grip, and in this way mechanically and electrically secure, the uninsulated portion of that cable to the ferrule 14.

Figure 2:
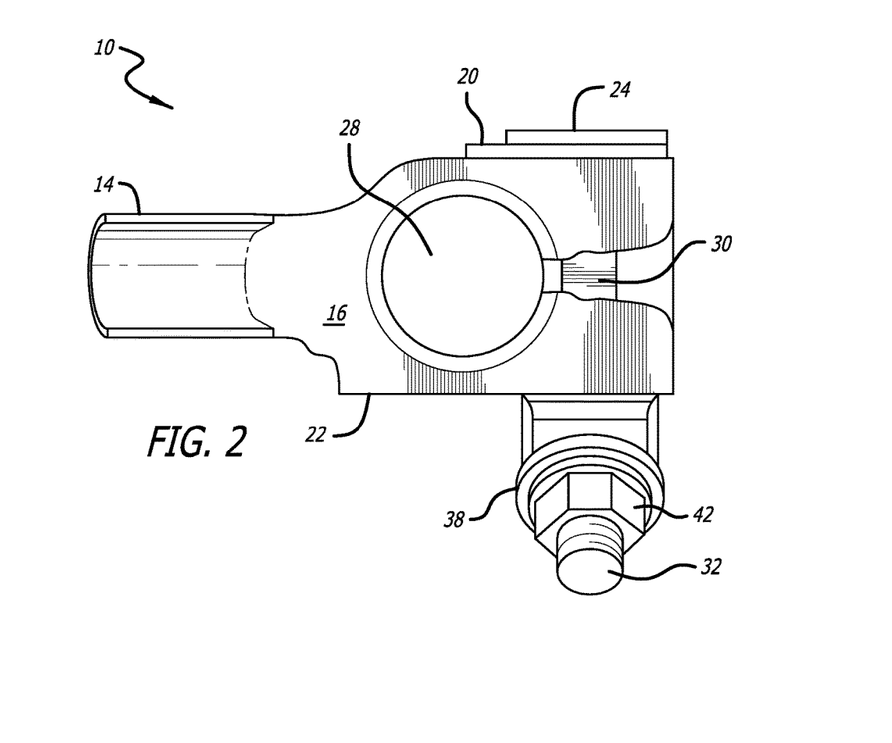
FIG. 2 is a top view of the clamp of FIG. 1, but with the threaded nut in a relatively lower position upon its threaded rod, and in contact with the washer.

As shown in various Figures, the body portion 12 includes a number of surfaces. FIGS. 1 and 2 show a top surface 16, FIG. 3 shows a bottom surface 18, and FIGS. 1, 2, 3, 4, 5, and 6 show a pair of opposite side walls 20 and 22.

Figure 3:
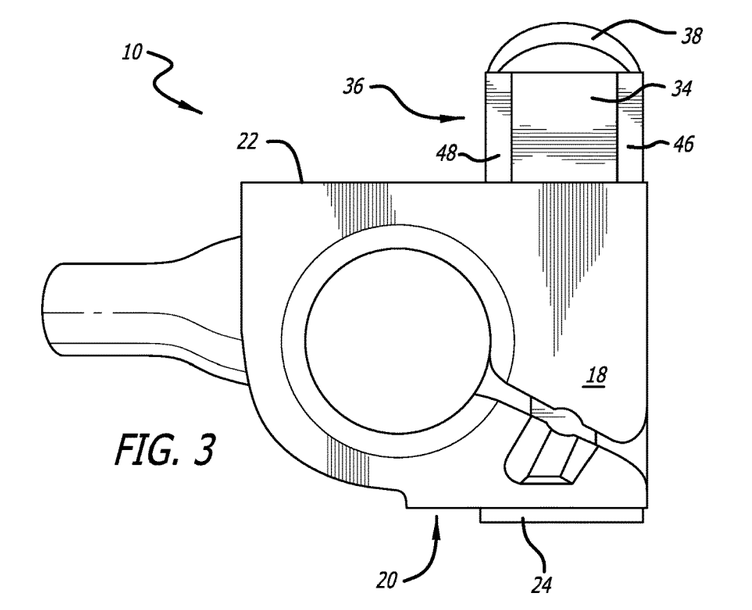
FIG. 3 is a bottom view of the clamp of FIG. 1.

As may be seen in various Figures, including FIGS. 2 and 3, the clamp 10 also includes an intermediate aperture 28 for engaging the generally frusto-conical shaped battery post (not shown). The size of the intermediate aperture 28 can be increased or decreased, to facilitate removal of the clamp 10 from the battery post, or to secure the clamp 10 on the battery post, respectively.

FIGS. 1 and 2 show the aperture 28 in its expanded or enlarged condition. In this condition, the aperture 28 is of a size well in excess of the diameter of the battery post to which it is to be connected. The enlarged aperture 28 of FIGS. 1 and 2 enables the battery terminal clamp 10 to be easily placed over the battery post.

After the battery terminal clamp 10 has been placed over the battery post, it is tightened in a manner to be described later. When the clamp 10 is tightened, the aperture 28 decreases in size, to the size depicted in FIGS. 6 and 7. This decreased aperture 28 diameter is very close to the diameter of the battery post to which the clamp 10 is to be connected. As a result, the clamp 10 tightly grips the battery post. Because of the structure described above, the clamp 10 can be easily secured to, or alternately removed from, the frusto-conical shaped battery post.

Figure 9:
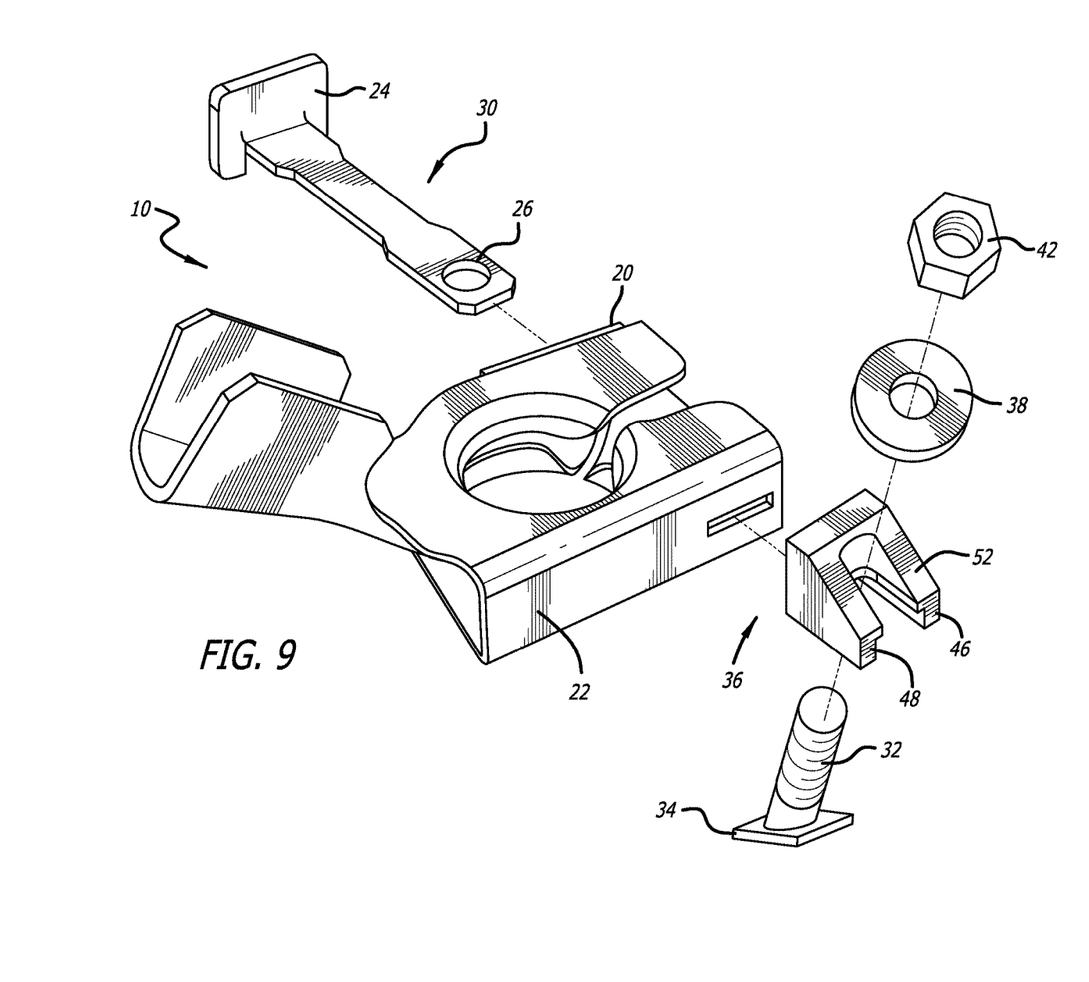
FIG. 9 is an exploded view of the battery terminal clamp of FIG. 1.

As shown most clearly in FIG. 9, a battery pull bar 30 is also provided. This battery pull bar 30 can preferably be made of a flat piece of metal, such as steel. When assembled within the confines of the clamp 10 of the invention, this battery pull bar 30 is positioned along a line extending generally from one side wall 20 of the clamp 10 to the other side wall 22 of the clamp 10. As may best be seen in FIGS. 2, 3, and 9, the length of the battery pull bar 30 exceeds the distance between the two side walls 20 and 22. As may also be seen in FIG. 9, battery pull bar 30 includes a flange 24 at a first lateral end of the pull bar 30, and an orifice 26 at a second lateral end of the pull bar 30.

Figure 4:
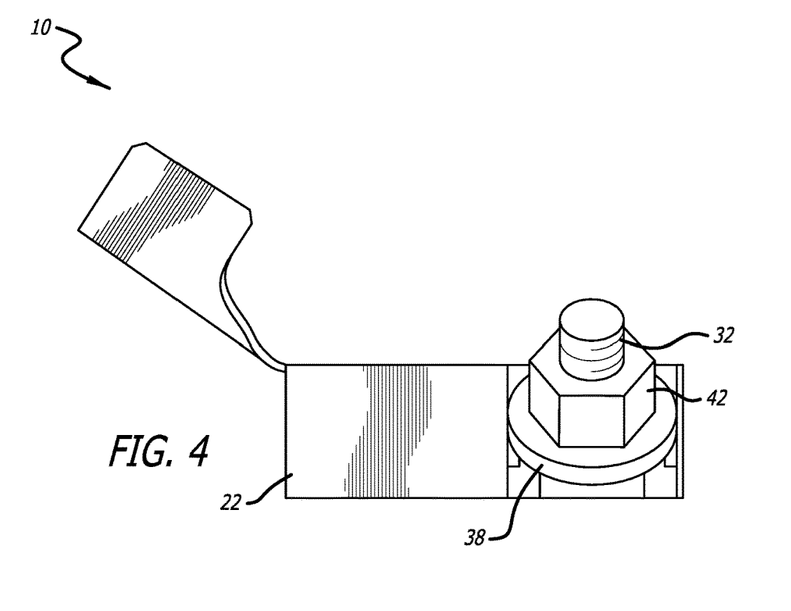
FIG. 4 is a right side view of the clamp of FIG. 1.
Figure 5:
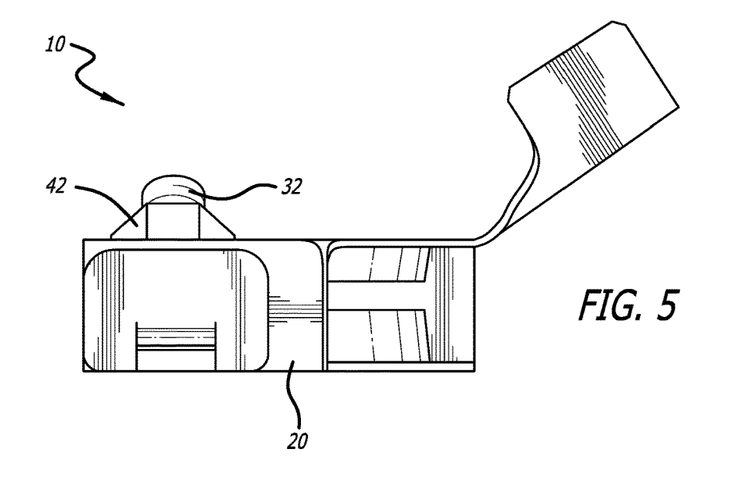
FIG. 5 is a left side view of the clamp of FIG. 1.
Figure 6:
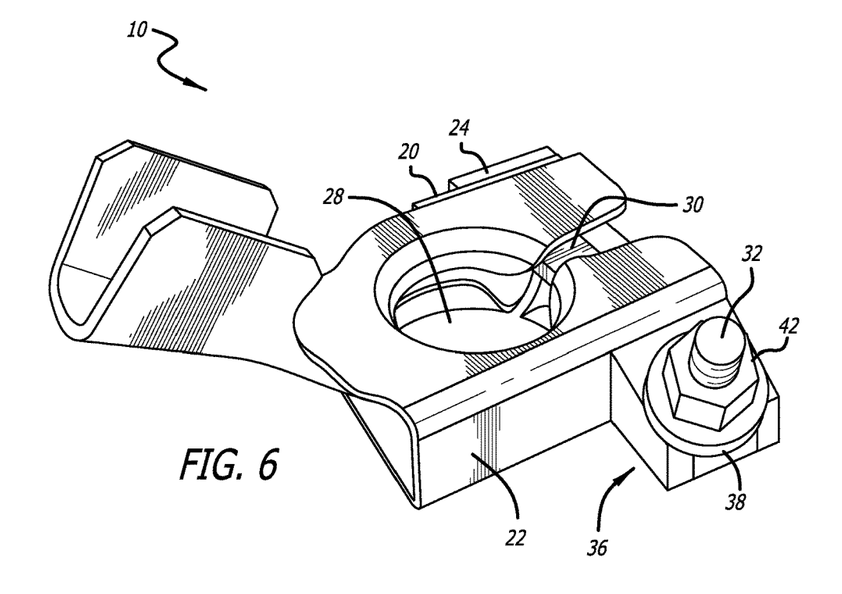
FIG. 6 is a perspective view of the battery terminal clamp of FIG. 2, with the threaded nut in a somewhat lower position upon its threaded rod.
Figure 7:
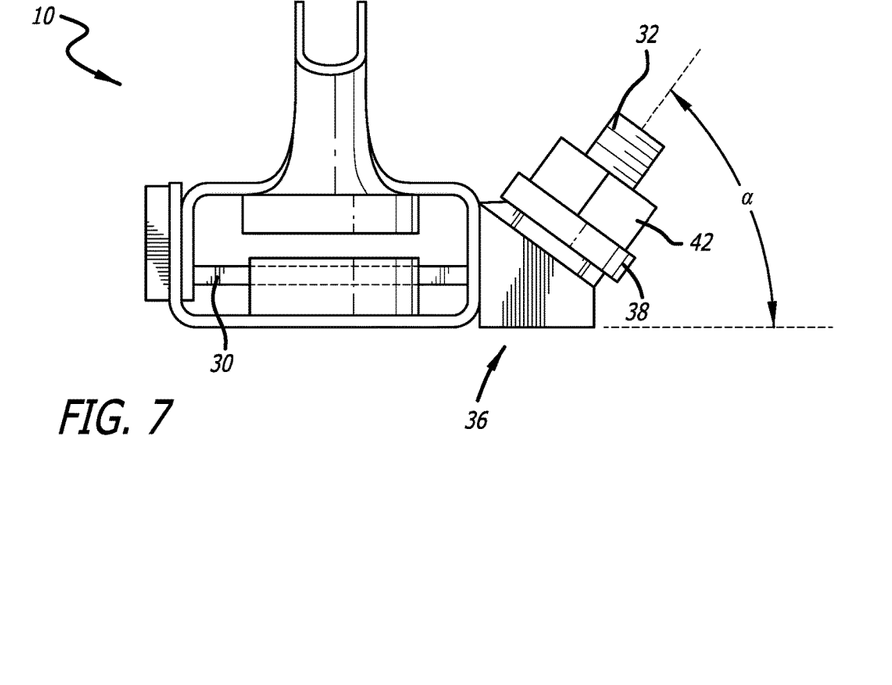
FIG. 7 is an end view of the clamp of FIG. 6.

As may best be seen in FIGS. 4, 5, and 7, a rod 32, most preferably a threaded rod, extends upwardly from the base of the clamp 10. As may best be seen in FIG. 7, this threaded rod 32 may be disposed at an angle α of between 30° and 65° from the horizontal. In this preferred embodiment, the threaded rod 32 of FIG. 7 is disposed at angle α of 55° from the horizontal.

As may also be seen in the exploded view of FIG. 9, the threaded rod 32 includes an integral base pad 34. Because the base pad 34 is horizontally oriented relative to the clamp 10, the threaded rod 32 also extends upwardly from the base pad 34 at about a 55° angle. This base pad 34 helps to secure the threaded rod 32 to a position in the general vicinity of the side wall 22.

The clamp 10 also includes a wedge-shaped element 36. The position of this wedge-shaped element 36 relative to the clamp 10 may best be seen in FIGS. 1, 4, 6, and 7. The element 36 may best be seen in the exploded view of FIG. 9.

Figure 8:
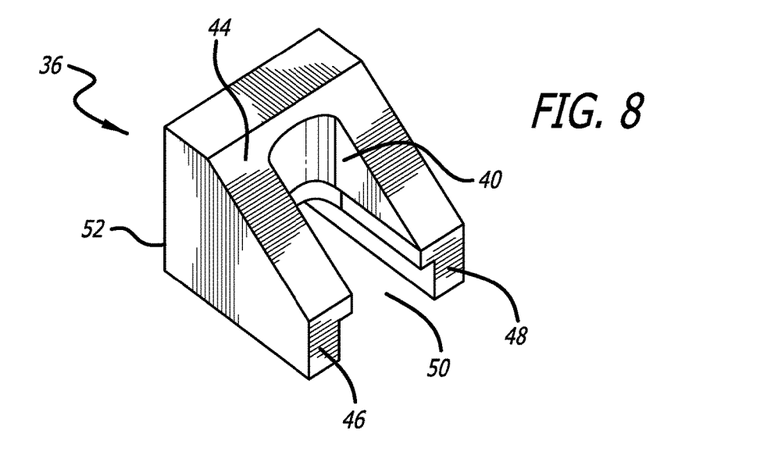
FIG. 8 is a front, perspective view of the wedge-shaped element of the clamp of FIG. 1.

As may be seen in FIG. 8, wedge-shaped element 36 has a generally elongated or oblong opening 40. This elongated or oblong opening 40 is also completely contained by the various walls of the element 36. As a result of this oblong construction of opening 40, wedge 36 can move both (a) vertically, up and down along the rod 32; and (b) horizontally, towards and away from the side wall 22 of battery terminal clamp 10.

This wedge-shaped element 36 is also preferably made of a rigid metal such as die-cast steel. As noted above, and as may be seen by comparing the positions of the wedge-shaped element 36 in FIGS. 1 and 7, respectively, this element 36 is positioned generally along the threaded rod 32, for movement along this threaded rod 32.

The clamp 10 of the invention also includes a conventional threaded nut 42. This threaded nut 42 rotates upon the threaded rod 32. Clockwise rotation of the threaded nut 42 moves the nut downwardly along the threaded rod 32, while counterclockwise rotation of the threaded nut 42 moves the nut upwardly along the threaded rod 32.

As the threaded nut 42 is turned clockwise and moves downwardly upon the threaded rod 32, the nut 42 either directly or indirectly abuts, and forces down, the wedge-shaped element 36. This, in turn, causes the wedge-shaped element 36 to push on the side wall 22 and thereby start the closure of the intermediate aperture 28. Indirect contact between the nut 42 and the wedge-shaped element 36 occurs if, as is preferred, there is a washer 38 between the nut 42 and that element 36. Direct contact between the nut 42 and the wedge-shaped element 36 occurs if there is no washer 38 between the nut 42 and that element 36.

FIG. 9 shows the embodiment of the invention of FIG. 1, but in an exploded view. When the threaded nut 42 is removed from the threaded rod 32, certain components of the battery terminal clamp 10 of the invention can be disassembled. As previously discussed and as may be seen in this FIG. 9, the threaded rod 32 includes an integrally formed base or pad 34.

FIGS. 8 and 9 also show the wedge-shaped element 36 in more detail. The ramp 44 of this element 36 is disposed at an angle of approximately 35° to the horizontal. The wedge-shaped element 36 has a height of approximately 14.5 mm, a width of approximately 14.0 mm, and a length of approximately 19.77 mm. As may be seen in FIG. 8, the gap 50 between its arms 46 and 48 is approximately 9.70 mm.

When assembled in the manner depicted in FIG. 1, the pad 34 that forms the base of threaded road 32 is positioned between the arms 46 and 48 of wedge-shaped element 36, i.e., in the gap 50 of the wedge-shaped element 36. The portion of the pad 34 that fits between the arms 46 and 48 has a width of approximately 9.56 mm. Because the gap 50 is slightly larger at 9.70 mm, the pad 34 and its integral threaded rod 32 can move forward and back within this gap 50. That forward and back movement is caused as a result of the upward and downward movement of the threaded nut 42 on the threaded rod 32.

In order to tighten the battery terminal clamp 10, as when installing the clamp 10 onto a battery post, the threaded nut 42 is turned clockwise. When this is done, the flat side 52 (FIG. 8) of the wedge-shaped element 36 that faces the side surface wall 22 pressures that wall 22. In addition, the battery pull bar 30 moves to the right, using the direction depicted in FIG. 7. As a result, the intermediate aperture 28 is reduced in size, and the clamp 10 tightens on the battery post.

In order to loosen the battery terminal clamp 10, as when removing the clamp 10 from a battery post, the threaded nut 42 is turned counterclockwise. When this is done, the flat side 52 of the wedge-shaped element 36 that faces the side surface wall 22 releases pressure on that wall 22. In addition, the battery pull bar 30 moves to the left, using the direction depicted in FIG. 7. As a result, the intermediate aperture 28 is increased in size, and the clamp 10 loosens its grip on the battery post. The clamp 10 may then be removed from the battery post.

Figure 10:
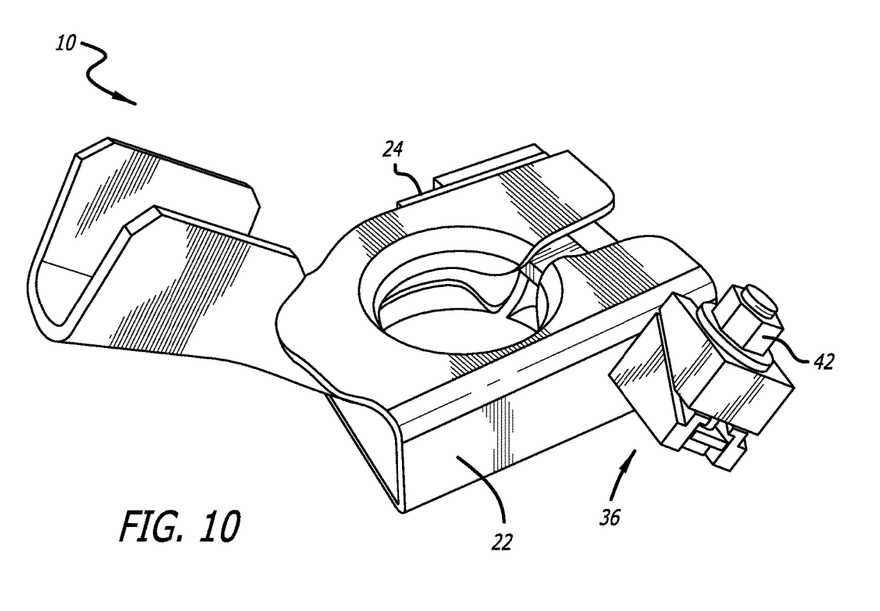
FIG. 10 is a perspective view of a second embodiment of the invention.

FIG. 10 shows a second embodiment of the invention. In the first embodiment of FIGS. 1-9, the threaded rod 32 is disposed perpendicular to the lengthwise axis of the connector 10. In this second embodiment of FIG. 10, the threaded rod is disposed parallel to the lengthwise axis of the connector. In both cases, the angle α of the threaded rod to the horizontal can range from between 30 and 65°.

A battery terminal clamp has been described which achieves good mechanical and electrical connection to the terminal post of a battery. The connector of the present invention affords easy and convenient connection and disconnection from the battery post through rotation of a standard, top-mounted fastener.

It is understood that, given the above description of the embodiments of the invention, various modifications may be made by one skilled in the art. Such modifications are intended to be limited only by the scope of the below claims.

The invention claimed is:

1. A battery terminal clamp having a body portion; the body portion having a top, bottom, and a pair of opposite side walls; and the body portion further having an intermediate aperture for engaging a battery post, the size of said intermediate aperture being variable to accommodate the placement of the body portion onto, and the removal of the body portion from, the battery post; a threaded rod extending upwardly relative to the body portion at an angle of between 35° and 65°; and a wedge-shaped element abutting one side wall of the body portion for effecting a reduction in the size of the intermediate aperture, further comprising a battery pull bar extending horizontally from one side wall of the body portion to the opposite side wall of the body portion.

2. The battery terminal clamp of claim 1, where the battery pull bar includes a flange at its first lateral end.

3. The battery terminal clamp of claim 1, wherein the threaded rod extends upwardly relative to the body portion at an angle of approximately 55°.

4. The battery terminal clamp of claim 1, wherein the battery terminal clamp is made of one piece.

5. The battery terminal clamp of claim 1, further comprising a threaded nut that is inserted onto the threaded rod, the threaded nut abutting against the wedge-shaped element, and being movable upon the threaded rod in an upward and downward direction.

6. The battery terminal clamp of claim 5, further comprising a washer disposed between the threaded nut and the wedge-shaped element.

7. The battery terminal clamp of claim 1, wherein the threaded rod includes an integral base pad.

8. The battery terminal clamp of claim 1, where the battery pull bar includes an orifice at its second lateral end.

9. The battery terminal clamp of claim 8, wherein the threaded rod is disposed in the orifice of the battery pull bar.

10. The battery terminal clamp of claim 7, wherein the wedge-shaped element includes a first arm and a second arm.

11. The battery terminal clamp of claim 10, wherein the integral base pad is slidably movable between the first arm and the second arm of the wedge-shaped element.

12. The battery terminal clamp of claim 10, wherein the wedge-shaped element includes an oblong opening defined between the first arm and the second arm.

13. A battery terminal clamp having a body portion; the body portion having a top, bottom, and a pair of opposite side walls; and the body portion further having an intermediate aperture for engaging a battery post, the size of said intermediate aperture being variable to accommodate the placement of the body portion onto, and the removal of the body portion from, the battery post; a threaded rod extending upwardly relative to the body portion at an angle of between 45° and 60°; a battery pull bar extending from one side wall of the body portion to the opposite side wall of the body portion; and a wedge-shaped element abutting one side wall of the body portion for effecting a reduction in the size of the intermediate aperture.

* * * * *